United States Patent
Tan et al.

(10) Patent No.: US 6,661,151 B2
(45) Date of Patent: Dec. 9, 2003

(54) ALTERNATOR FOR VEHICLES HAVING PERMANENT MAGNETS IN ROTOR

(75) Inventors: Yoshiki Tan, Anjo (JP); Nakato Murata, Nagoya (JP)

(73) Assignee: Denso Corporation, Kariya (JP)

( * ) Notice: Subject to any disclaimer, the term of this patent is extended or adjusted under 35 U.S.C. 154(b) by 22 days.

(21) Appl. No.: 09/985,132

(22) Filed: Nov. 1, 2001

(65) Prior Publication Data

US 2002/0053855 A1 May 9, 2002

(30) Foreign Application Priority Data

Nov. 6, 2000 (JP) .......................................... 2000-337842
May 30, 2001 (JP) .......................................... 2001-161893

(51) Int. Cl.[7] .......................... H02K 21/04; H02K 1/27; H02K 19/24
(52) U.S. Cl. ......................................... 310/263; 310/91
(58) Field of Search ................................. 310/42, 43, 91, 310/263; 29/596–598

(56) References Cited

U.S. PATENT DOCUMENTS

| | | | | | |
|---|---|---|---|---|---|
| 3,283,188 | A | * | 11/1966 | Edick | 310/263 |
| 4,611,139 | A | * | 9/1986 | Godkin et al. | 310/266 |
| 5,306,977 | A | * | 4/1994 | Hayashi | 310/263 |
| 5,543,677 | A | * | 8/1996 | Fakler | 310/263 |
| 5,578,885 | A | * | 11/1996 | Alford et al. | 310/263 |
| 5,793,144 | A | * | 8/1998 | Kusase et al. | 310/263 |
| 5,825,116 | A | * | 10/1998 | Ishikawa | 310/263 |
| 5,828,155 | A | * | 10/1998 | Adachi et al. | 310/263 |
| 5,907,209 | A | * | 5/1999 | Ishida | 310/263 |
| 6,011,343 | A | * | 1/2000 | Taniguchi | 310/263 |
| 6,013,968 | A | * | 1/2000 | Lechner et al. | 310/263 |
| 6,104,118 | A | * | 8/2000 | Kanazawa et al. | 310/263 |
| 6,157,111 | A | * | 12/2000 | Asao | 310/263 |
| 6,433,455 | B1 | * | 8/2002 | Kometani et al. | 310/263 |

FOREIGN PATENT DOCUMENTS

| | | |
|---|---|---|
| JP | A 4-165950 | 6/1992 |
| JP | A 4-251553 | 9/1992 |

\* cited by examiner

Primary Examiner—Tran Nguyen
(74) Attorney, Agent, or Firm—Oliff & Berridge, PLC

(57) ABSTRACT

A brushless-type alternator has a rotor, which comprises a pair of pole cores. The pole cores include a plurality of nail parts, respectively. The nail parts are arranged alternately in a rotating direction of the rotor. The nail parts are coupled to-each other with a non-magnetic ring. A permanent magnet is interposed between adjacent two of the nail parts, and fixedly held in position with the non-magnetic ring. The permanent magnets are located radially inside or outside the non-magnetic ring.

8 Claims, 6 Drawing Sheets

ALTERNATOR FOR VEHICLES HAVING PERMANENT MAGNETS IN ROTOR

CROSS REFERENCE TO RELATED APPLICATION

This application is based on and incorporates herein by reference Japanese Patent Applications No. 2000-337842 filed on Nov. 6, 2000 and No. 2001-161893 filed on May 30, 2001.

BACKGROUND OF THE INVENTION

The present invention relates to an alternator such as a brushless-type alternator for vehicles such as passenger cars and trucks, and a method of manufacturing the same.

In brushless-type alternators (alternating current generators), a field coil is wound on a field core, which is provided separately from a rotor core and fixed to a frame so that only the rotor core rotates in the electric power generating operation. For rotation in the power generating operation, the rotor core is spaced apart from the field core with a clearance from the field core. This clearance causes magnetic loss and reduced electric power generated by the alternator when compared with a normal brush-type alternator of the similar size.

JP-A-4-165950 and JP-A-4-251553 teach brushless-type alternators, which have permanent magnets between adjacent nails of a rotor core to restrict leakage flux occurring between the nails. The nails and the permanent magnets are integrated with a holding member to restricting the permanent magnets from dropping off from the rotor core. However, this arrangement results in complicated constructions around the permanent magnets and complicated manufacturing and assembling processes.

SUMMARY OF THE INVENTION

The present invention addresses this problem, and has an object to improve electric power generated by an alternator without complicating manufacturing and assembling processes.

According to the present invention, an alternator has a rotor, which comprises a pair of pole cores. The pole cores include a plurality of nail parts arranged alternately in a rotating direction, respectively. The nail parts are coupled to each other with a non-magnetic ring. A permanent magnet is interposed between adjacent two of the nail parts, and fixedly held in position with the non-magnetic ring. The permanent magnets are located radially inside or outside the non-magnetic ring.

BRIEF DESCRIPTION OF THE DRAWINGS

The above and other objects of the present invention will become more apparent from the following detailed description made with reference to the accompanying drawings. In the drawings.

DETAILED DESCRIPTION OF THE PREFERRED EMBODIMENT

The present invention will be described further in detail with reference to various embodiments which is directed to brushless-type alternators.

First Embodiment

Figure 1:
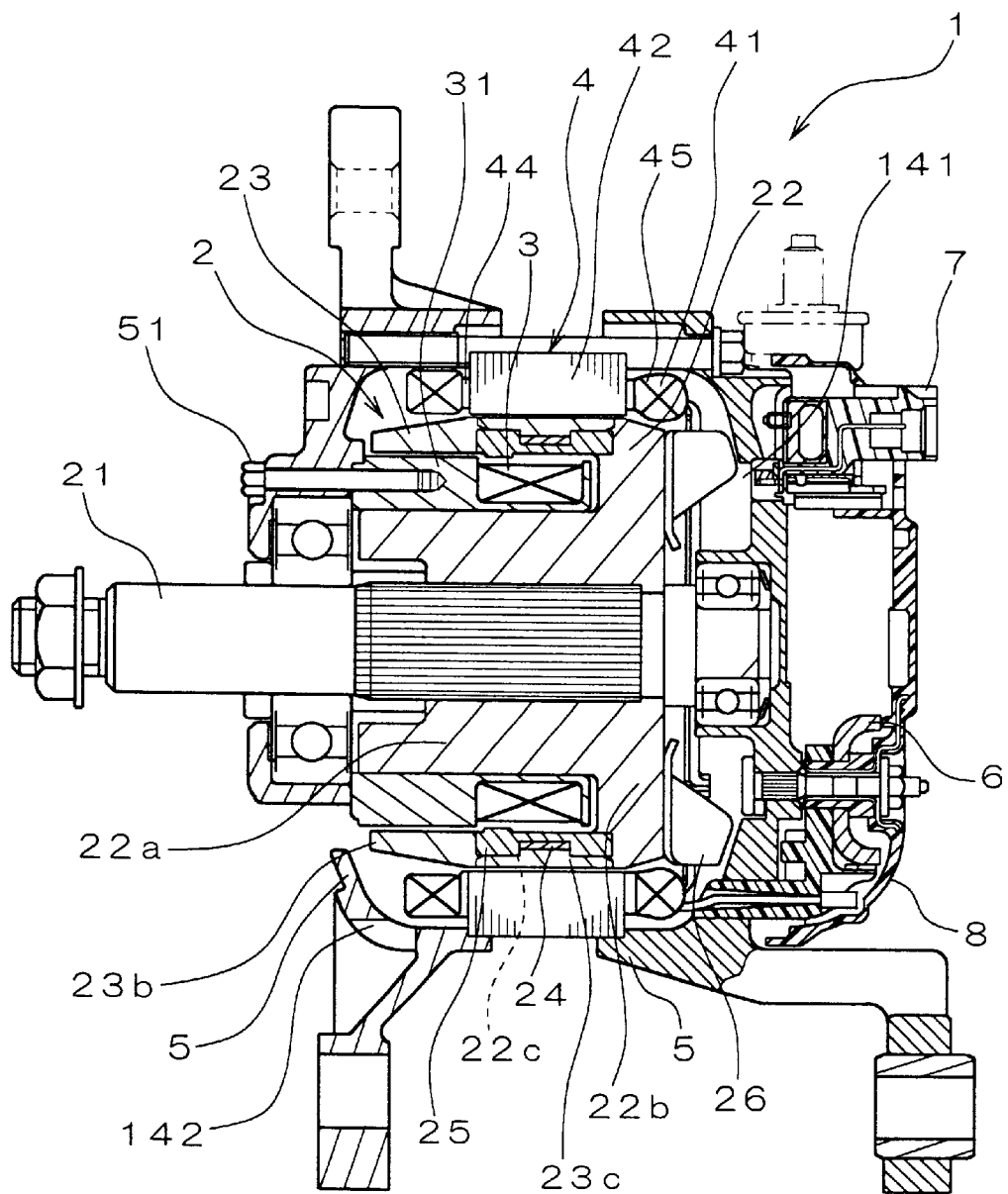
FIG. 1 is a sectional view showing an alternator according to a first embodiment of the present invention.

Referring first to FIG. 1, an alternator 1 has a rotor 2, a field coil 3, a stator 4, front and rear frames 5, a rectifier device 6, a voltage regulator device 7, a rear cover 8 and the like.

The rotor 2 includes a rotary shaft 21, a rear side pole core (rotor core) 22 fixed to the shaft 21, a crown ring-shaped pole core (rotor core) 23, a non-magnetic ring 24 coupling the pole cores 22 and 23 to each other, a plurality of permanent magnets 25 fixed to the non-magnetic ring 24, and a cooling fan 26 attached to the axial side end of the pole core 22.

The pole core 22 includes a cylindrical boss part 22a press-fit on the rotary shaft 21, a disk part 22b extending radially outward from the boss part 22a, and a plurality of nail parts 22c extending in the axial direction from the outer periphery of the disk part 22b in parallel with the boss part 22a. The pole core 23 includes a cylindrical part 23b, and a plurality of nail parts 23c extending from the cylindrical part 23b in the axial direction in parallel with the nail parts 22c of the pole core 22.

The nail parts 22c and 23c are arranged alternately in the circumferential direction (rotating direction of the rotor 4), and firmly coupled to each other with the non-magnetic ring 24. For instance, the non-magnetic ring 24 is inserted tightly into the radially inside of the nail parts 22a in the axial direction, and then the nail parts 23a are inserted into the radially outside of the non-magnetic ring 24 in the axial direction. The non-magnetic ring 24 and the nail parts 22a, 23a may be welded together to strengthen coupling thereamong. Each permanent magnet 25 is interposed between a spacing provided between adjacent nail parts 22c and 23c as shown in FIG. 5.

Figure 2:
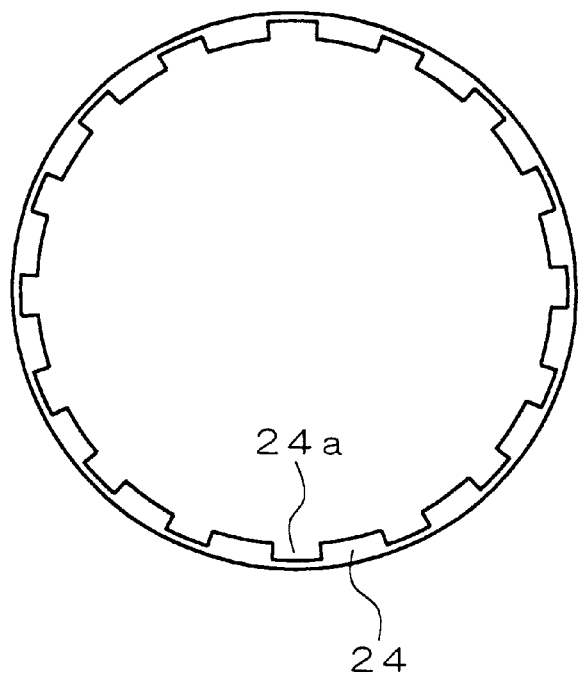
FIG. 2 is a plan view showing a non-magnetic ring used in the first embodiment.
Figure 3:
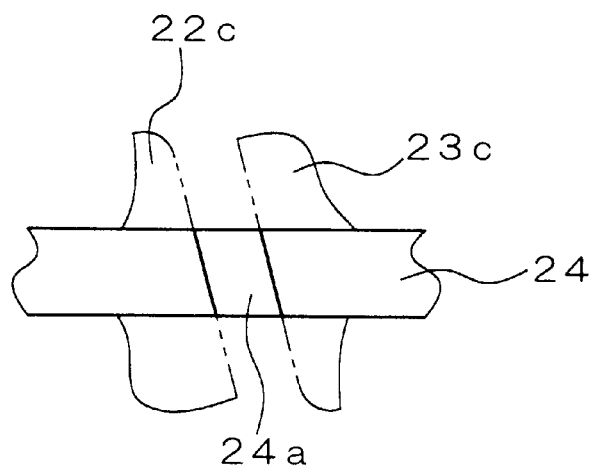
FIG. 3 is a schematic view showing the non-magnetic ring with nails viewed from its inside in a radial direction in the first embodiment.

As shown in FIGS. 2 and 3, the non-magnetic ring 24 is shaped in an annular belt form. The non-magnetic ring 24 has a plurality of slit grooves 24a on the inner peripheral side to receive the permanent magnets 25 therein. The position and the number of each slit groove 24a are determined to be located between the adjacent nail parts 22c and 23c. The slit groove 24a has the same inclination against the central axis of the non-magnetic ring 24 as that of the opposing circumferential end surfaces of the nail parts 22c and 23c.

Figure 4:
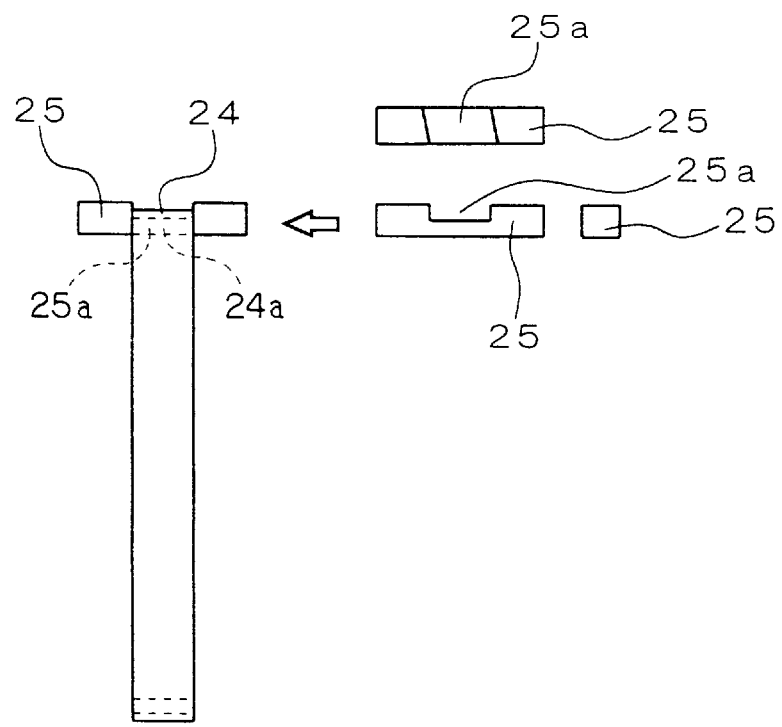
FIG. 4 is a schematic view showing a process of assembling the non-magnetic ring and a permanent magnet in the first embodiment.
Figure 5:
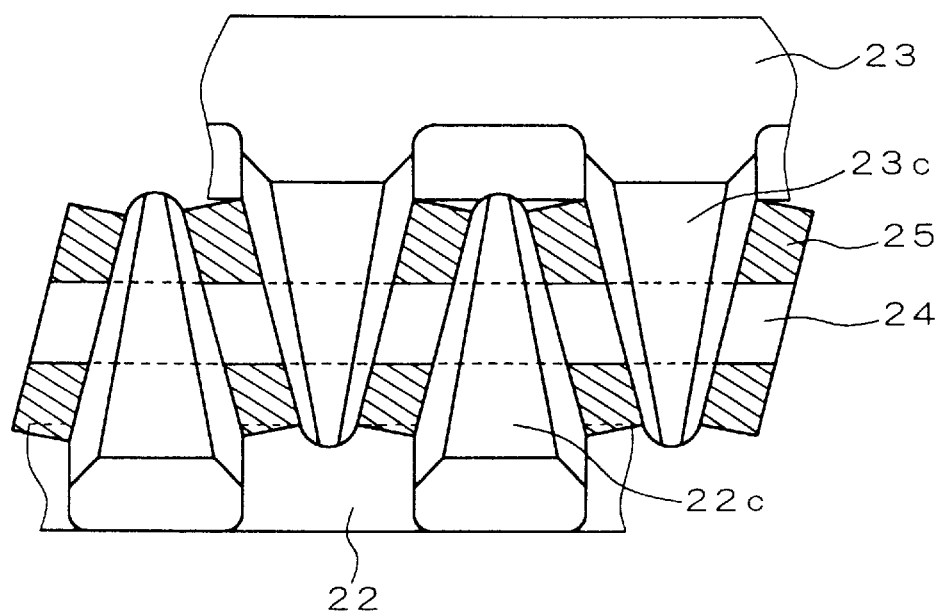
FIG. 5 is a side view showing a part of a rotor to which the permanent is assembled in the first embodiment.

As shown in FIGS. 4 and 5, each permanent magnet 25 is shaped in a rectangular parallelepiped form to be easily fit in the spacing between the adjacent nail parts 22c and 23c. The permanent magnet 25 has a slit groove 25a, which is inclined against short side of a rectangle. The permanent magnet 25 is assembled with the non-magnetic ring 24 with the slit grooves 24a and 25a being in engagement with each other. The permanent magnet 25 is thus located radially inner side of the non-magnetic ring 24. The pole cores 22 and 23 are assembled to each other in a pressed condition in the axial direction.

The permanent magnet 25 may be fixed to the non-magnetic ring 24 by press-fitting, welding, adhesive-fitting or the like. Further, magnet powder may be filled in clearances between the permanent magnet 25 and the adjacent nail parts 22c, 23c and brazed with brazing material, so that the permanent magnet 25 and the adjacent nail parts 22c, 23c are tightly fixed to each other.

Referring to FIG. 1 again, the field coil 3 is wound on the cylindrical field core 31, which is fixed to the front frame 5 with bolts 51. The field coil 3 thus generates a fixed magnetic field when energized with a field current. The stator 4 includes a stator core 42, stator coils 41 wound on the stator core 42, insulators 44 for electrically insulating the stator core 42 and the stator coils 41. The stator core 42 is made of a stack of thin steel plates, and formed with a plurality of slots for the stator coils 41 on its radially inner side.

The frames 5 tightly hold the stator 4 from both axial sides, and accommodate the rotor 2 radially inside the stator 4. The rotor 2 is supported rotatably around the rotary shaft 21 with a spacing between its outer periphery of the pole cores 22, 23 and the stator core 42. The field core 31 and the field coil 32 are located between the boss part 22a and the cylindrical part 23b with spacing from the boss part 22a and the cylindrical part 23b. The frames 5 have cooling air inlet openings 141 at the axial end side and cooling air outlet openings 142 near the stator coils 41.

The alternator 1, particularly the rotor 2, is manufactured as follows. The permanent magnets 25 are fixed to the nonmagnetic ring 24. Then, the unit of the permanent magnets 25 and the non-magnetic ring 24 are assembled to one of the pole cores 22, 23 in an axial direction. Finally, the other one of the pole cores 22, 23 is assembled to the one of the pole cores 22, 23 in the axial direction.

The alternator 1 is driven by an engine (not shown) through a pulley (not shown) and a belt (not shown). When the field current is supplied to the field coil 3 from the voltage regulator 7, the nail parts 22c and 23c of the pole cores 22 and 23 are magnetized. The stator coils 41 generate three-phase a.c. voltages in response to the rotating magnetic field generated by the rotor 2. This voltages are rectified by the rectifier device 6 to provide a d.c. output for charging a battery (not shown) and electric loads (not shown).

According to this embodiment, the pole cores 22 and 23 are held tightly with the non-magnetic ring 24, and the permanent magnets 25 are fixed between the nail parts 22c and 23c with the non-magnetic ring 24. Therefore, manufacturing and assembling processes are simplified.

Further, because the pole core 23 is in the crown ring shape having the nail parts 23c, the pole core 23 can be easily moved in the axial direction. Therefore, the permanent magnets 25 can be assembled with ease while pressing the permanent magnets 25 to the circumferential side surfaces of the nail parts 22c and 23c.

In addition, because the non-magnetic ring 24 and the permanent magnet 25 are formed with respective slit grooves 24a and 25a and assembled to each other by mating the slit grooves 24a and 25a, the permanent magnets 25 can be placed in position with ease. Because the permanent magnets 25 are located radially inside the non-magnetic ring 24, the permanent magnets 25 are restricted from dropping out from the rotor 2 due to centrifugal force.

In the above embodiment, the alternator output may be easily changed by selecting one of permanent magnets, such as ferrite magnet, neodymium magnet, alnico magnet, samarium-cobalt magnet, and the like, which have different magnetic force from one another, without changing specifications of the stator coil 41. This is advantageous even when the occupancy ratio of the field coil 41 in a slot is limited.

The permanent magnet 25 may be made of a resinous soft magnetic material which may be deformed easily to fitting between the nails 22c and 23c.

Second Embodiment

Figure 6:
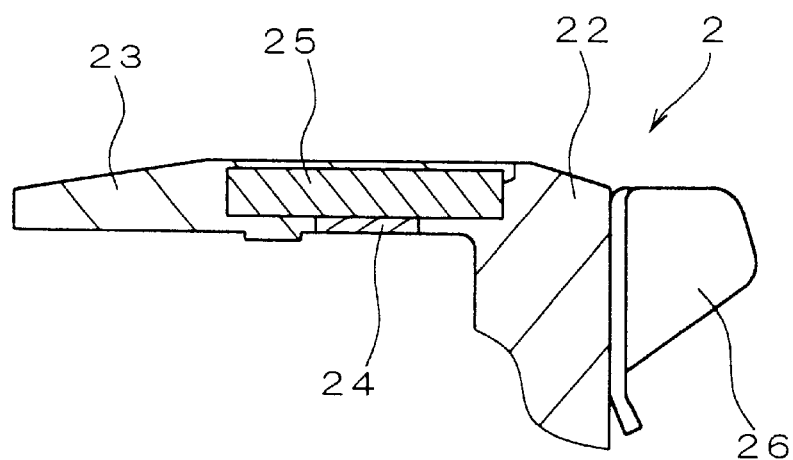
FIG. 6 is a sectional view showing a part of the rotor of an alternator according to a second embodiment of the present invention.
Figure 7:
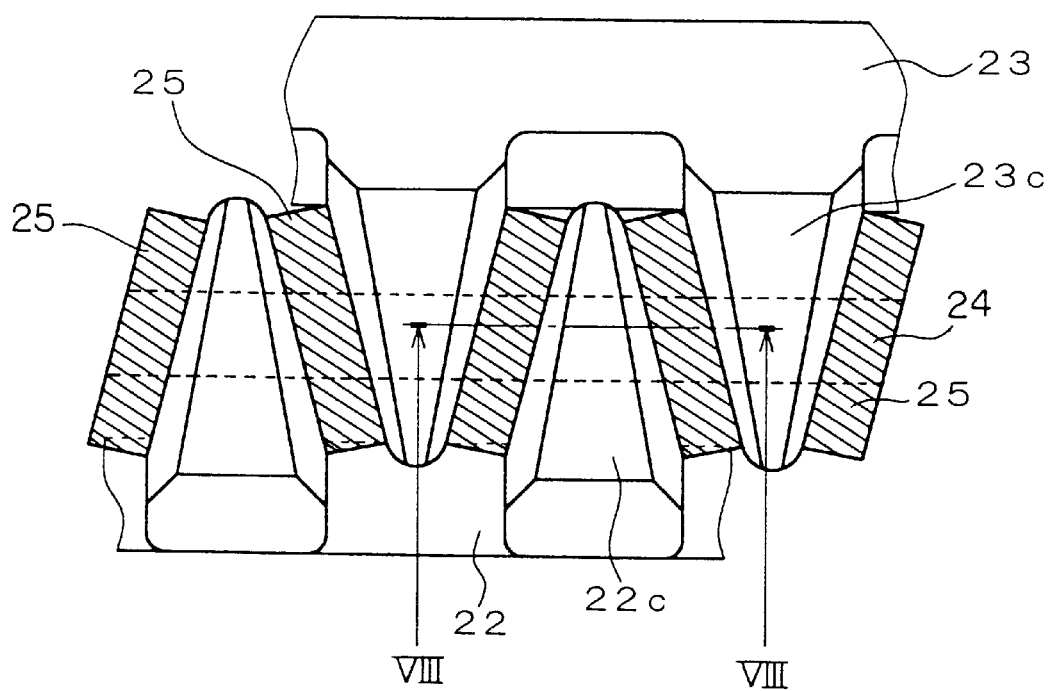
FIG. 7 is a side view showing a part of the rotor to which permanent magnets are assembled in the second embodiment.
Figure 8:
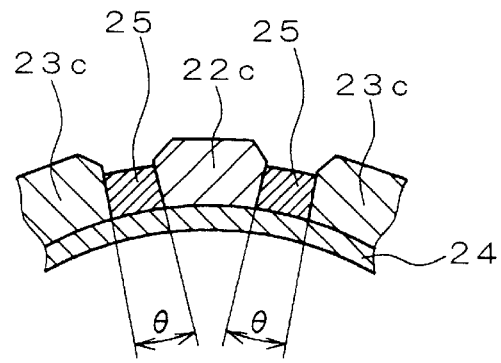
FIG. 8 is a sectional view taken along line VIII—VIII in FIG. 7 and showing the permanent magnets and the non-magnetic ring in the second embodiment.

In a second embodiment, as shown in FIGS. 6 and 7, the permanent magnet 25 is located between the nail parts 22c and 23c of the pole cores 22 and 23 at the radially outside of the non-magnetic ring 24 which connects the pole cores 22 and 23. Further, as shown in FIG. 8, each of the nail parts 22c and 23c has a cross section, which has a width gradually increasing from the radially inner side to the radially outer side. Thus, the spacing between the adjacent two of the nail parts 22c and 23c are increased from the radially inner side to the radially outer side. The permanent magnet 25 in generally rectangular parallelepipe is shaped to have a cross section, which has a width decreasing from the radially inner side to the radially outer side in opposition to the nail parts 22c and 23c. That is, the angle θ shown in FIG. 8 is set larger than 0 degree, so that the nail parts 22c, 23c and permanent magnet 25 have respective taper surfaces. Thus, the magnet 25 is pressed in position by the nail parts 22c, 23c and the non-magnetic ring 24.

According to this embodiment, because the radially inner width of the permanent magnet 25 is enlarged, the permanent magnet 25 is enabled to contact the pole cores 22c, 23c and the non-magnetic ring 24 with larger contact area. Further, because the radially outer width of the permanent magnet 25 is shortened, the centrifugal force at the radially outer part is reduced and dropping off of the permanent magnet 25 due to the centrifugal force is restricted.

Figure 9:
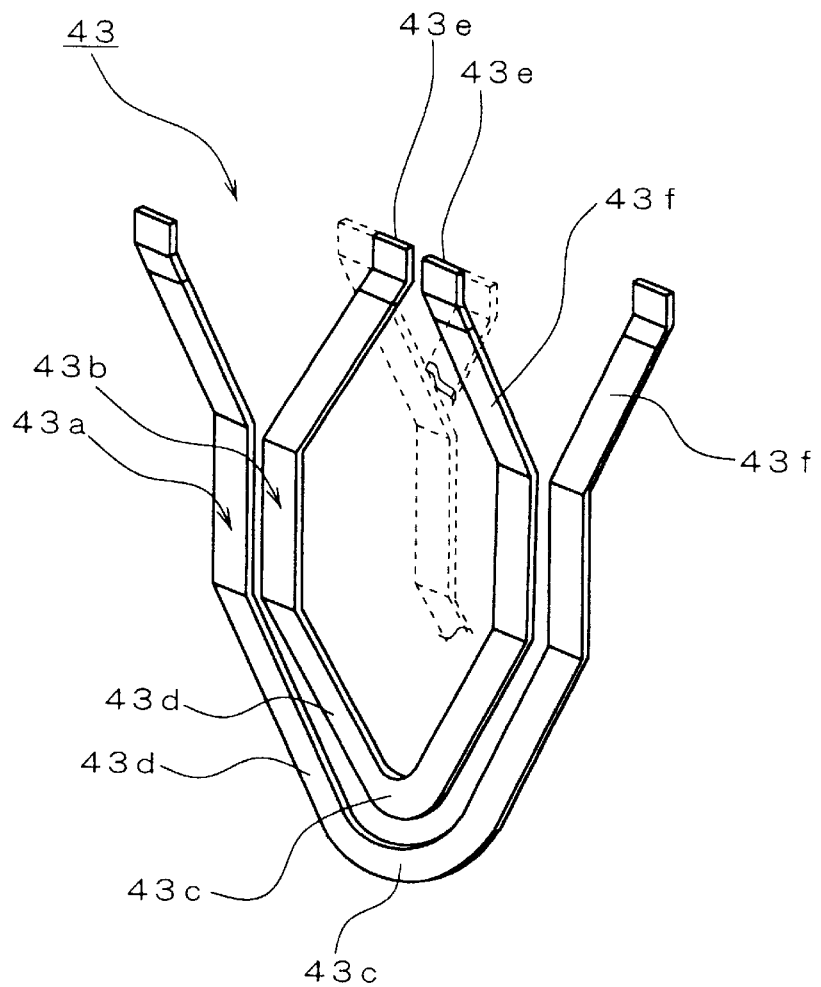
FIG. 9 is a perspective view showing schematically conductor segments of a stator coil used in the second embodiment.

In the above first and second embodiments, the stator coil 41 is preferably made of a plurality of U-shaped conductor segments 43 shown in FIG. 9 to improve cooling and power output performance of the alternator 1.

Specifically, each conductor segment 43 comprises a pair of conductor segments 43a and 43b as a conductor unit. The conductor segment 43 has turn parts 43c and end parts 43e. The turn parts 43c and adjacent inclined parts 43c form a coil end 45 at the rear side of the alternator 1 as shown in FIG. 1. The end parts 43e and adjacent inclined parts 43f form a coil end 45 at the front side of the alternator 1. The end parts 43e of one conductor segment 43 are joined with those of another conductor segment 43 (not shown) by TIG (tungsten inert gas) welding, for instance.

Figure 10:
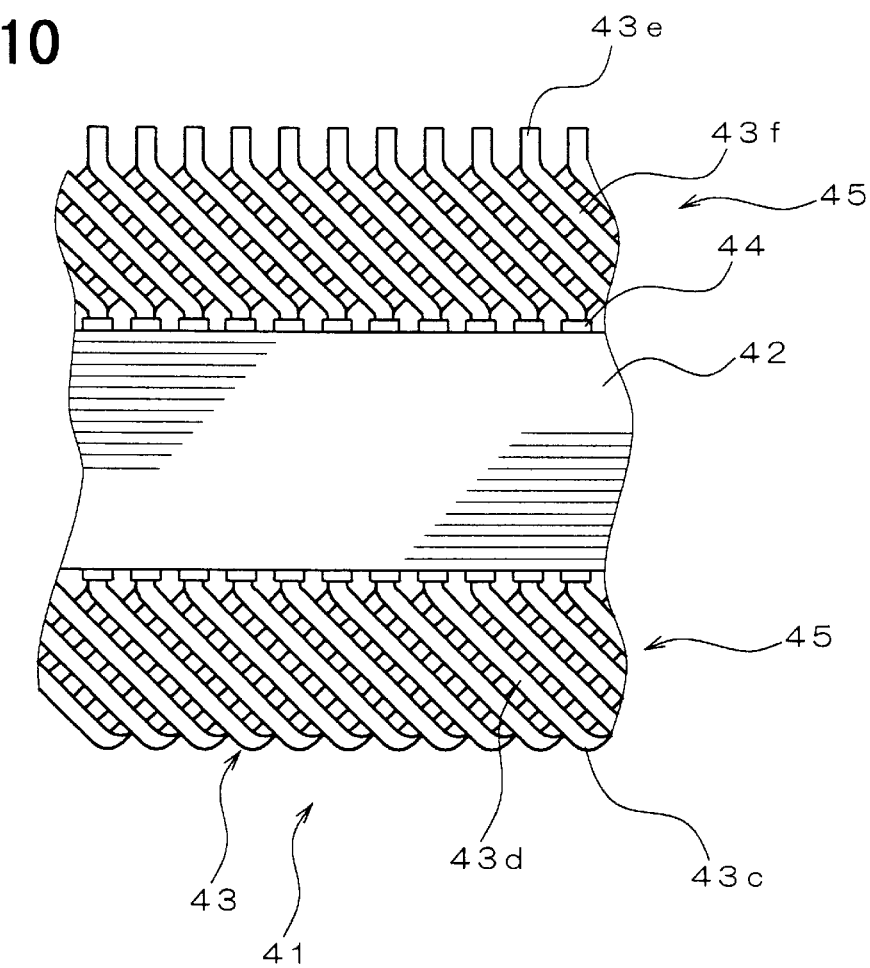
FIG. 10 is a side view showing a part of the rotor using the conductor segment in the second embodiment.
Figure 11:
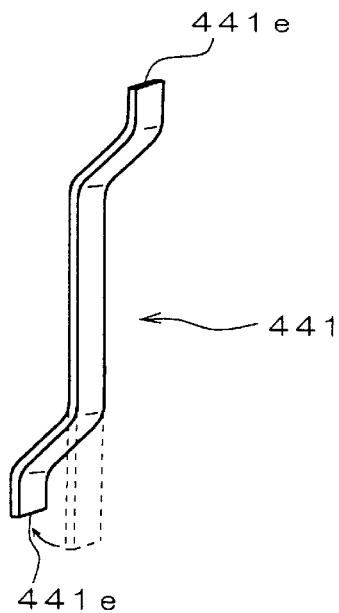
FIG. 11 is a perspective view showing a conductor segment which has no turning parts.

As shown in FIG. 10, each conductor segment 43 of the stator coil 41 is arranged in the stator core 42 so that the turn parts 43c and end parts 43e are located at one and the other axial end sides of the stator core 42. The inclined parts 43f at one coil end 45 are arranged in two (outer and inner) layers so that they parallel in each layer but transverse between the outer and inner layers. The inclined parts 43d at the other coil end 45 are also arranged in the similar manner as the inclined parts 43f. It is to be noted that the conductor segment 43 may be replaced with a conductor segment 441 having no turn parts. The stator coils 41 may be formed by joining end parts 441e of one conductor segment 441 with those of another conductor segment.

According to this construction and arrangement of stator coils 41, sufficient clearances can be provided in the coil ends 45 so that cooling air may pass through the coil ends 45 in the radially outward direction to reduce resistance of stator coils 41 and hence heat generation in the stator coils 41. As a result, the permanent magnets 25 arranged radially inside the stator 4 can be heated less by the stator 4, and demagnetization of the permanent magnets 25 which arises at high temperatures can be minimized.

The present invention should not be limited to the disclosed embodiments, but may be implemented in many other ways without departing from the spirit of the invention. For instance, the coupling of the permanent magnets, the nail parts and the non-magnetic ring may be used in alternators in which the field coil is wound on the rotor.

What is claimed is:

1. An alternator, comprising:
   a frame;
   a shaft;
   a stator coil fixed to the frame;
   a field coil fixed to the frame;
   a pair of pole cores each having a plurality of nail parts, respectively, the pole cores being supported rotatably by the frame through the shaft;
   a non-magnetic ring coupling the nail parts, wherein the nail parts are coupled adjacent to each other in a rotation direction of the pole cores; and
   a plurality of permanent magnets interposed between the nail parts and fixed to the non-magnetic ring, wherein one of the pole cores is fixed to the shaft and the other of the pole cores is fixed to the one of the pole cores through the ring, wherein at least one of the non-magnetic ring and each of the permanent magnets has a slit groove at a location of engagement therebetween and the non-magnetic ring has the slit grooves at a radially inner side thereof and the permanent magnets have the slit grooves at a radially outer side thereof and wherein the permanent magnets are arranged radially inside the non-magnetic ring.

2. The alternator as in claim 1, wherein each of the permanent magnets is pressed by adjacent two of the nail parts and the non-magnetic ring.

3. The alternator as in claim 2, wherein a spacing between side faces of the adjacent two of the nail parts is decreased from a radially inner side to a radially outer side of each of the pole cores.

4. The alternator as in claim 1, wherein the one of the pole cores has a cylindrical part fixed to the shaft and the nail parts extend from the cylindrical part in an axial direction, wherein the pole cores are assembled to each other in an axially pressed condition, and the field coil is spaced apart in a radially inside direction.

5. The alternator as in claim 1, wherein the permanent magnets are selected from one of a plurality of types of permanent magnetic material having different magnetic forces.

6. The alternator as in claim 1, wherein each of the permanent magnets is made of a resinous soft magnetic material.

7. An alternator, comprising:
   a frame;
   a pair of pole cores supported rotatably in the frame and having a plurality of nail parts, respectively;
   a non-magnetic ring coupling the nail parts, wherein the nail parts are coupled adjacent to each other in a rotation direction of the pole cores; and
   a plurality of permanent magnets interposed between the nail parts and fixed to the non-magnetic ring, wherein the non-magnetic ring and each of the permanent magnets have respective slit grooves which engage with each other.

8. An alternator, comprising:
   a frame;
   a field coil supported fixedly to the frame;
   a pair of pole cores each having a plurality of nail parts, respectively;
   a non-magnetic ring coupling the nail parts adjacent to each other in a rotation direction of the pole cores; and
   a plurality of permanent magnets interposed between the nail parts and fixed to the non-magnetic ring, wherein at least one of the non-magnetic ring and each of the permanent magnets has a slit groove at a location of engagement therebetween, and the non-magnetic ring has the slit grooves at a radially inner side thereof and the permanent magnets have the slit grooves at a radially outer side thereof, inside the non-magnetic ring.

* * * * *